(12) United States Patent
Laing et al.

(10) Patent No.: US 6,736,616 B2
(45) Date of Patent: May 18, 2004

(54) CENTRIFUGAL PUMP WITH INTEGRATED MOTOR

(75) Inventors: Karsten A. Laing, La Jolla, CA (US); Nikolaus J. Laing, La Jolla, CA (US); Zoltan Jagasics, Gögöllö (HU)

(73) Assignees: Oliver Laing, Remseck (DE); Karsten Laing, Remseck (DE); Birger Laing, Remseck (DE)

( * ) Notice: Subject to any disclaimer, the term of this patent is extended or adjusted under 35 U.S.C. 154(b) by 60 days.

(21) Appl. No.: 10/151,809

(22) Filed: May 20, 2002

(65) Prior Publication Data

US 2003/0215343 A1 Nov. 20, 2003

(51) Int. Cl.$^7$ ................................................ F04B 35/04
(52) U.S. Cl. ................................ 417/423.7; 417/423.7; 417/423.12; 310/90; 310/156.38
(58) Field of Search ............................ 417/423.1, 423.3, 417/423.7, 423.12, 424.1; 310/67 R, 90, 156.38, 216

(56) References Cited

U.S. PATENT DOCUMENTS

| | | | | |
|---|---|---|---|---|
| 3,447,469 A | * | 6/1969 | Laing | .................. 417/423.7 |
| 3,803,432 A | * | 4/1974 | Laing | .................. 310/90 |
| 4,056,770 A | * | 11/1977 | Mohr et al. | .................. 324/205 |
| 4,072,446 A | * | 2/1978 | Walker | .................. 417/420 |
| 4,593,219 A | * | 6/1986 | Laing | .................. 310/218 |
| 4,658,166 A | | 4/1987 | Oudet | |
| 4,682,067 A | | 7/1987 | Oudet | |
| 4,866,323 A | | 9/1989 | Oudet et al. | |
| 4,880,362 A | * | 11/1989 | Laing et al. | .................. 417/365 |
| 5,808,395 A | * | 9/1998 | Anders et al. | .................. 310/266 |
| 2002/0071775 A1 | * | 6/2002 | Laing | .................. 417/410.1 |

FOREIGN PATENT DOCUMENTS

| | | |
|---|---|---|
| DE | 45808 | 6/1887 |
| DE | 78075 | 5/1893 |

OTHER PUBLICATIONS

Minimotor SA Product Design Web page Mar. 2, 2002 Minimotro SA, Switzerland.
The New QuantumLeap in Motor Technology:"Ferrous Loss–Free", date unknown.

* cited by examiner

*Primary Examiner*—Charles G. Freay
(74) *Attorney, Agent, or Firm*—Foley & Lardner

(57) ABSTRACT

A centrifugal pump with an integrally-constructed electrical motor. The motor has a hemi-spherical rotor mounting the impeller and comprising at least two permanent magnetic poles. The rotor is balanced on a spherical bearing including a ball or a hemispherical structure mounted at the end of a shaft engaged into an axial cavity in the smallest end of the rotor. A thin, waterproof and static septum is positioned in the air gap between the stator and the rotor. The annular stator includes a bowl-shaped yoke and a winding, applied to the inner surface of the yoke, comprising segments running in successive alternate sections obliquely to the motor's axis of rotation between the upper and lower rims of the yoke. Due to the geometry of the motor, the residual magnetic forces urge the rotor toward a balanced position against the shaft and bearing.

16 Claims, 5 Drawing Sheets

US 6,736,616 B2

CENTRIFUGAL PUMP WITH INTEGRATED MOTOR

FIELD OF THE INVENTION

This invention relates to electric pumps and more particularly to centrifugal pumps where the impeller is integrally formed with the rotor of an electrical motor.

BACKGROUND OF THE INVENTION

Spherical centrifugal pumps commonly have an impeller secured to the rotor of the driving electrical motor. Since the rotor is immersed in the fluid being pumped, it is customarily balanced on a single-ball bearing. The stator located outside the fluid-carrying chamber feature a winding arranged in an axial direction and wound around the piece of a complicated stator frame. These motors suffer from considerable EDDY current and ohmic losses. When the pump is not powered, the rotor is no longer balanced by magnetic and gyroscopic forces and may tilt into an eccentric position. When the pump is started, considerable wear is caused upon the bearing before the stator assumes its correct axial alignment. The motors in such pump tend to have a relatively extended axial length.

SUMMARY OF THE INVENTION

The principal and secondary objects of this invention are to provide an electrically powered compact centrifugal pump where the rotor mounting the impeller is immersed in the fluid being pumped and is balanced on a single-ball bearing and kept firmly on that bearing in proper axial alignment in the absence of any electrical supply to the motor featuring a substantially reduced axial length compared to pump motors of prior art.

These and other valuable objects are achieved by using a permanently-magnetized rotor having a first upper surface mounting the impeller and a lower, axially opposite second surface of a smaller diameter. The peripheral wall of the rotor defines a spherical sector. The rotor is balanced on a spherical bearing including a ball mounted at the tip of a pillar or post extending from the pump housing into an axial cavity in the second smaller-diameter end. An annular stator has a yoke made of soft magnetic material and has a bowl-shaped inner surface that mirrors the outer face of the rotor. A sherical septum extending through the air gap between the rotor and the stator forms a barrier preventing the fluid being pumped from being in contact with the stator. A spherical winding comprising a plurality of segments arranged in a circular configuration is secured against the inner face of the yoke. The magnetic force generated by the rotor urges the rotor firmly against its bearing in a uniform and balanced manner in the absence of any power being supplied to the pump motor.

DESCRIPTION OF THE PREFERRED EMBODIMENT OF THE INVENTION

Figure 1:
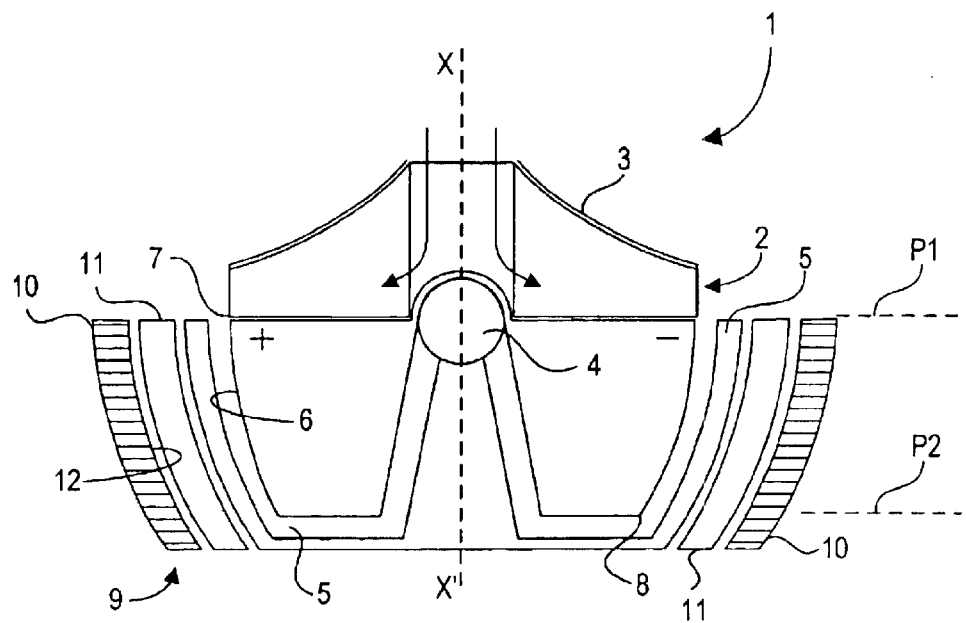
FIG. 1 is a cross-sectional view of the impeller and motor-driving portion of a centrifugal pump according to the invention.

Referring now to the drawing, there is shown in FIG. 1, an impeller and rotor portion 1 of motor for a centrifugal pump according to the invention. The flow of the pumped fluid is indicated by arrows. The rotor 2 which mounts the impeller 3 is balanced on a spherical-bearing 4, consisting of a ball and cap structure, inside a waterproof enclosure which includes a septum 5 running closely to the outer face 6 of the rotor. The septum is preferably thin and made from electrically non-conductive organic material, e.g., a thermoplastic, in order to eliminate EDDY-current losses. The rotor is formed by a permanent magnet. The outer face 6 of the rotor defines a spherical sector between two parallel planes P1 and P2 perpendicular to the motor axis of rotation X–X'. The upper rim 7 and lower rim 8 of the rotor lie within planes P1 and P2 respectively.

The stator 9 concentrically surrounds the septum 5 and rotor 2. The stator comprises a soft magnetic yoke 10 and a winding 11 applied against the inner surface 12 of the yoke. That inner surface and the winding mirror the spherical shape of the rotor outer face 6. The yoke is preferably made of insulation-coated soft ferro-magnetic particles.

If the motor is to be powered by an AC source, the rotor comprises a permanent magnet having a relatively low coercive force but high electrical conductivity.

Figure 2:
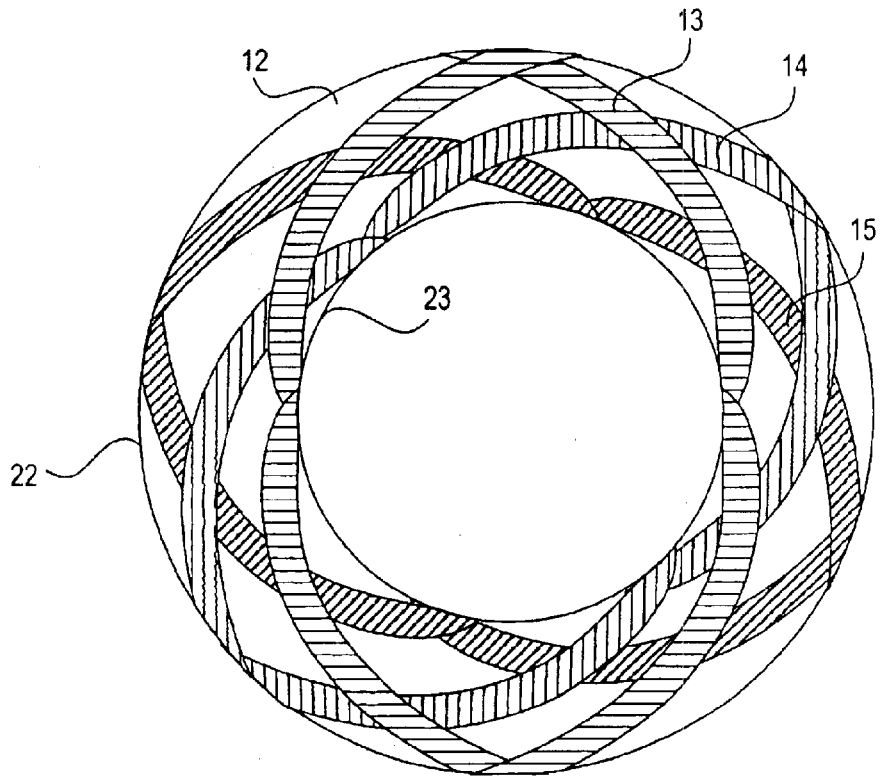
FIG. 2 is a top plan view of the stator with a three-phase, two-pole winding.
Figure 3:
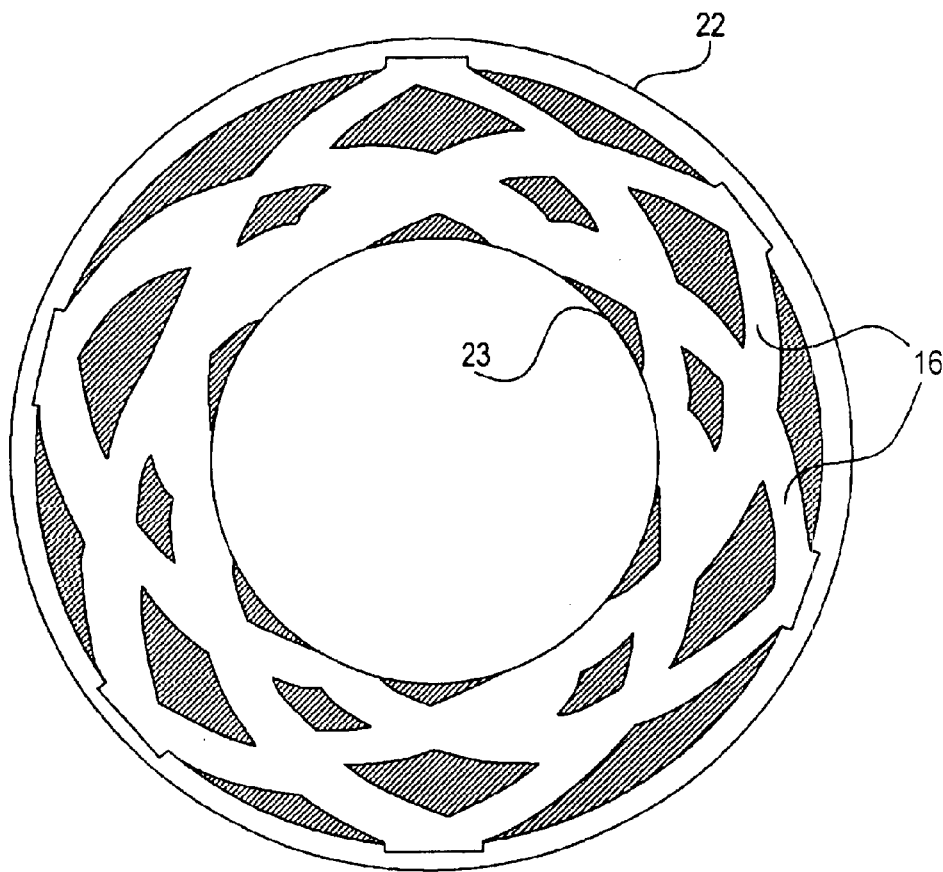
FIG. 3 is a top plan view of the yoke.

The winding 11 is divided into three separate phases 13, 14, 15 laid over the entire inner surface 12 of the yoke as illustrated in FIG. 2. Each phase of the winding consists of a multi-turn loop of wire folded into the saw-tooth configuration as will be explained below. The winding is preferably nested into a pattern of grooves 16 formed into the inner surface of the yoke as illustrated in FIG. 3.

Figure 4A:
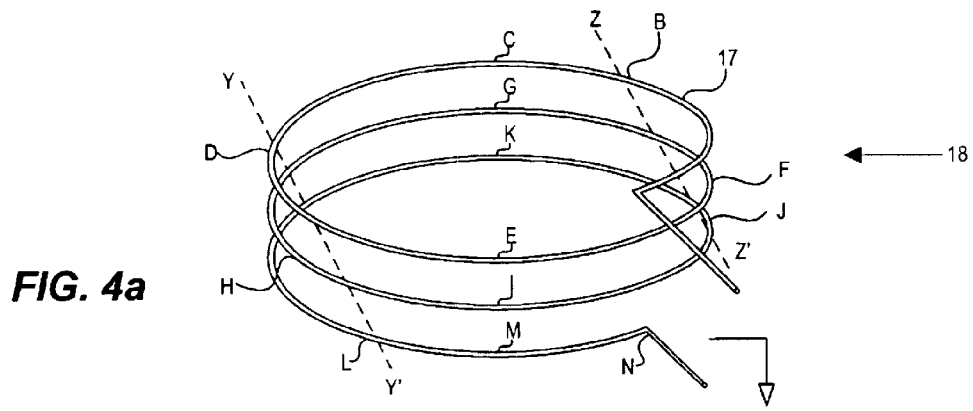
FIGS. 4a–4d are diagrammatical illustrations of a first winding fabrication.

Each phase winding is preferably made according to the steps illustrated in FIGS. 4a–4d where letter references A–N are used along every quadrant of each loop to indicate corresondence between the various views. First, a length of insulated wire 17 is coiled into an helix 18 as shown in FIG. 4a. For the sake of drawing clarity, only three spaced-apart turns are shown. In practice, a large number of turns are used, and each turn is preferably glued to the adjacent ones in order to form a loop in the form of a shallow cylinder with a ribbon-like wall. The diameter of the loop should be slightly larger than the diameter of the upper and larger rim 22 at the inner surface of the yoke.

Figure 4B:
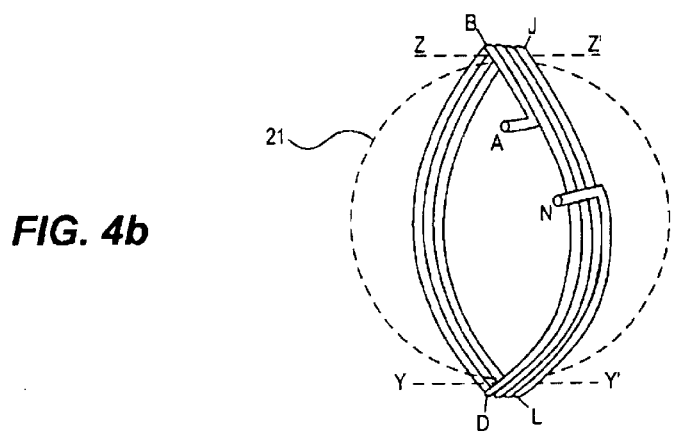
Figure 4C:
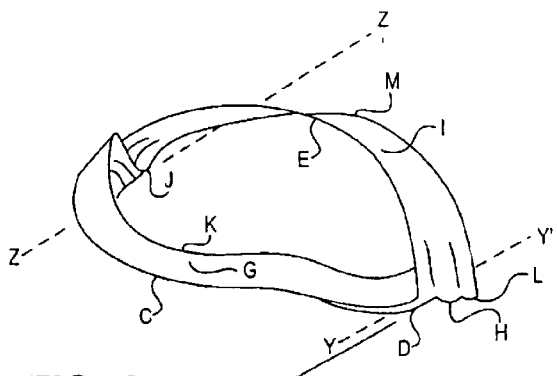
Figure 4D:
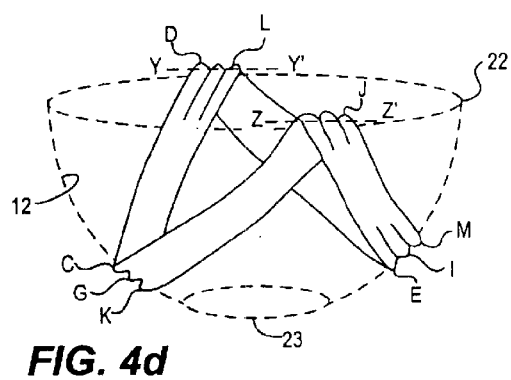

Next, the helix or loop 18 is folded, one half against the other half, but about two diametrically opposite axis Y–Y' and Z–Z' which are parallel to each other and oblique to the axis of the loop as illustrated in FIGS. 4a and 4b. The winding now assumes the shape of two arches with common roots but spaced-apart apices as shown in FIGS. 4b and 4c. The apex regions C, G, K, and EIM of the loops have the cross-sections that run obliquely to the Y–Y' and Z–Z' axes, and closely match the axial curvature of the yoke inner surface 12. The winding can now be dropped into the ball-shaped yoke and each segment can be pushed into its corresponding groove 16 cut into the inner surface of the yoke. When folding the loop, care should be taken to bring the two axes Y–Y' and Z–Z' to a distance slightly shorter than the diameter of a circle 21 corresponding to the largest, upper rim 22 of the yoke. The winding extends across the entire width of the inner surface of the yoke, that is from the upper rim 22 to the lower and smallest rim 23. These rims preferably lie in the two planes P1 and P2.

Figure 5:
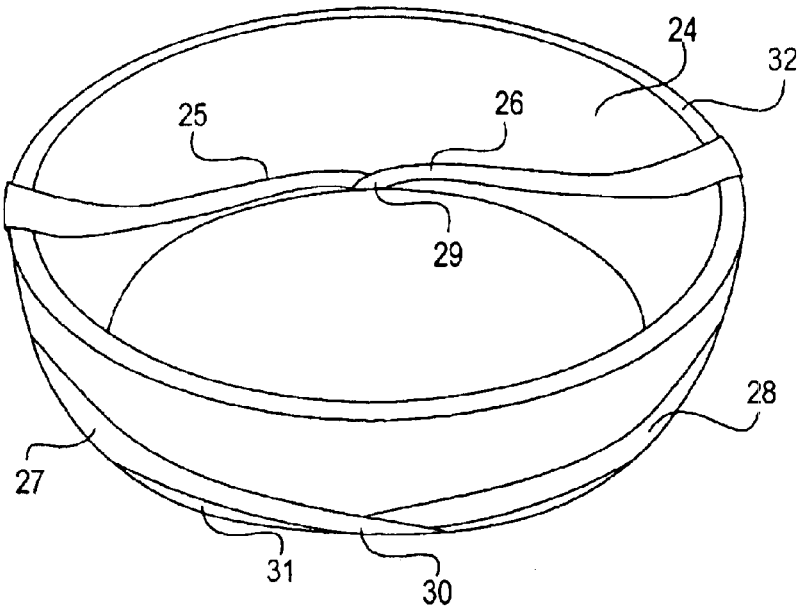
FIG. 5 is a perspective view of a first alternate winding configuration.

In the alternate embodiment of the winding 11 illustrated in FIG. 5, the helix or coil is wrapped around a thin circular frame 24 having the shape of a spherical sector. The frame is shaped and dimensioned to fit snugly against the inner surface of the yoke. The position and oblique orientation of the various segments 25, 26, 27, 28 are basically similar to the one in the earliest described embodiment of the winding. However, the two lower portions 29, 30, are folded upon themselves near the smallest edge 31 of the frame 24 so that the coil is folded into four segments. It should be noted that the winding is not wound through the frame but only folded over its lowest edge 32 and along the lower edge 31. No part of the winding passes below the bottom edge 31. Two segments 25,26 are laid against the inner wall of the frame, while the other two segments 27, 28 are laid against its outer wall.

Alternately, the winding can be wound around the frame as part of its construction, and thus, be folded over both the upper and lower edges of the frame.

Figure 6:
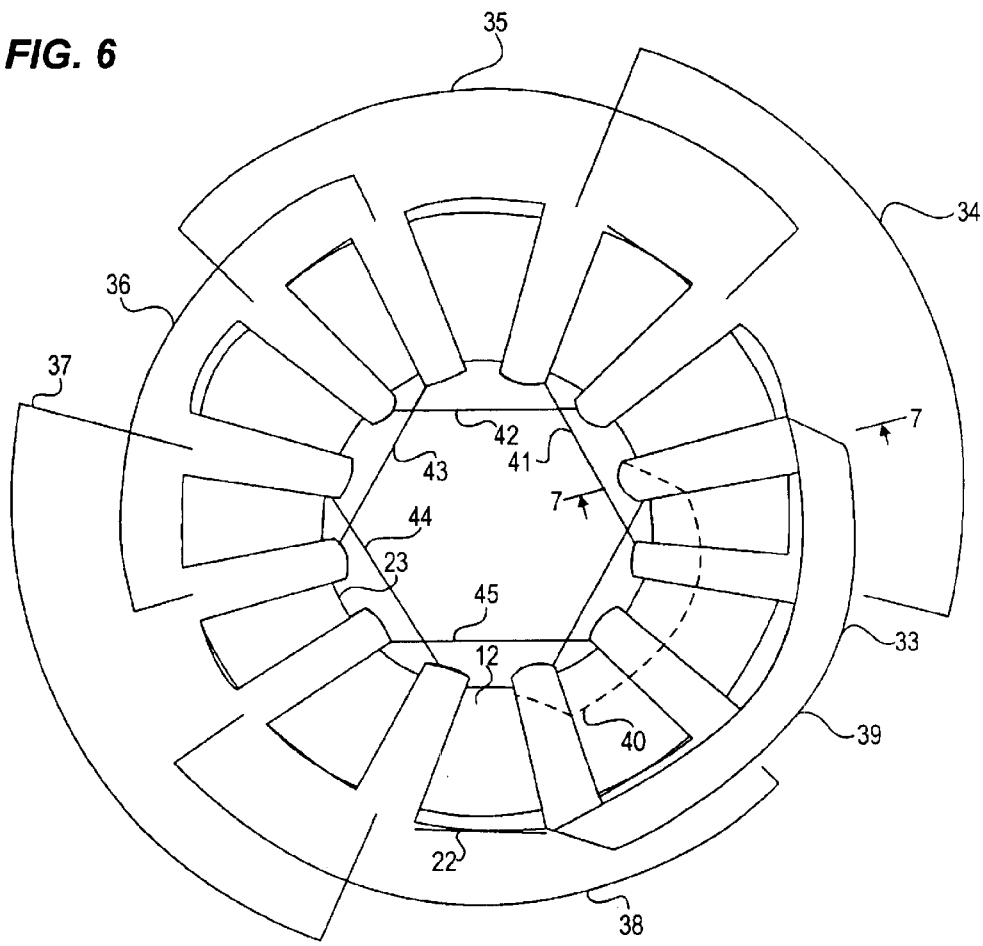
FIG. 6 is a top plan view of a stator with a second alternate embodiment of the winding.
Figure 8:
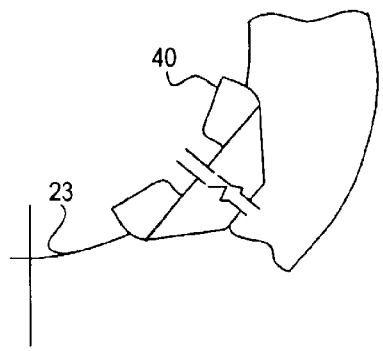
FIG. 8 is a bottom plan view of a lower winding connection.
Figure 7:
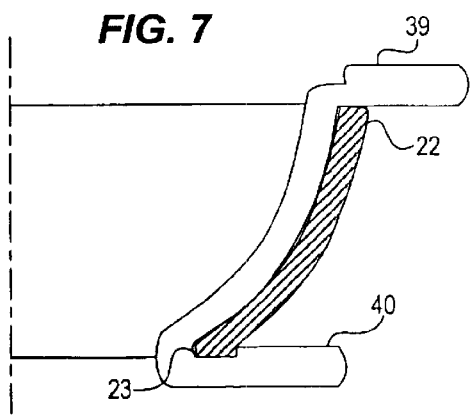
FIG. 7 is a partial cross-sectional view taken along line 7—7 of FIG. 6.

In a second alternate embodiment of the winding illustrated in FIGS. 6–8, helicoidal wire loops 33–38 are laid against the inside surface 12 of the yoke 10 in a side-by-side, three-phase configuration. A top portion 39 of each loop is folded in a trapezoidal arrangement and bent over the largest rim 22 of the yoke. A lower portion 40 of each loop is similarly folded in another trapezoidal arrangement and folded over the smallest rim of the yoke. The six loops are configured to form a three-phase, four-pole stator winding. Only one loop 33 is completely shown in the drawing. Lines 34–38 and 41–45 are used to indicate the paths of the other five loops.

It should be understood that other types of motors can be implemented using either one of the three types of windings. For instance, in a two-phase motor using the winding configurations such as the one illustrated in FIG. 6, could be implemented with a number of loops divisible by 4.

Figure 9:
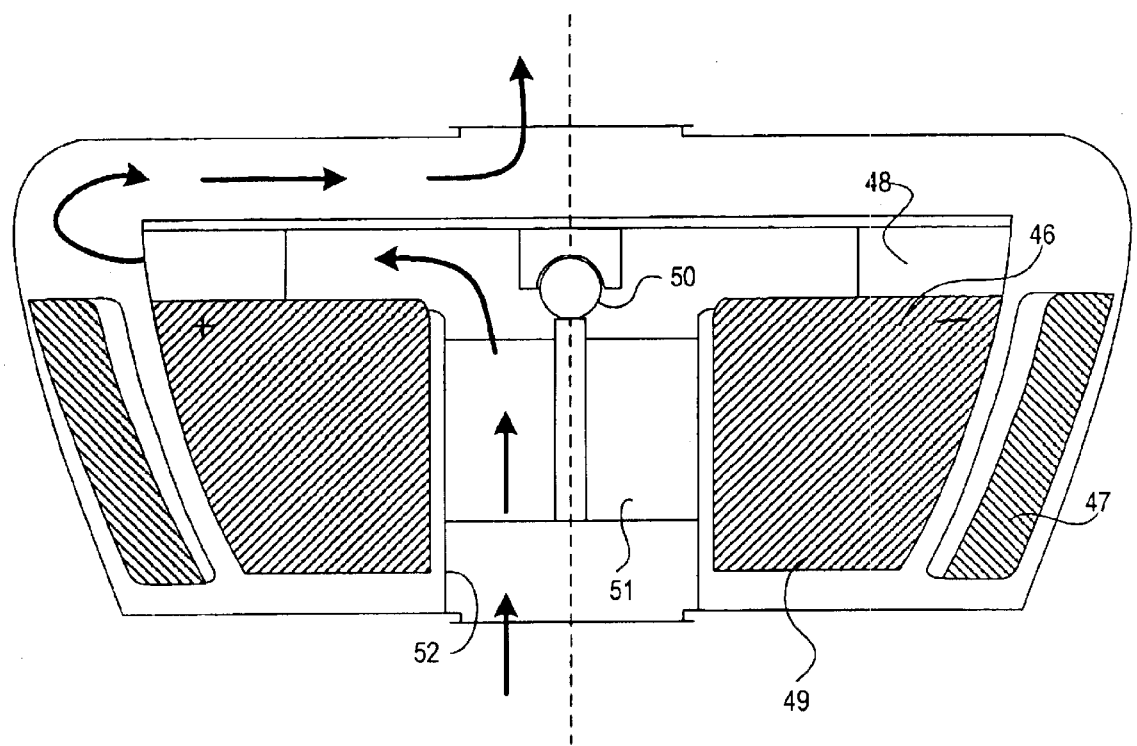
FIG. 9 is a cross-sectional view of an alternate embodiment of the pump.

In the alternate embodiment of the pump illustrated in FIG. 9, no septum separates the rotor 46 from the stator 47. Both are in contact with the fluid whose flow is indicated by arrows. The electrical components are the same as the ones described previously. The impeller 48 is attached to the rotor 46 including the multipole permanent magnet 49. The spherical-bearing 50 is supported by a series of vanes 51 positioned within the intake channel 52. It should be understood that this type of pump could not be used to move an electrically conductive fluid.

While the preferred embodiments of the invention have been described, modifications can be made and other embodiments may be devised without departing from the spirit of the invention and the scope of the appended claims.

What is claimed is:

1. A centrifugal pump which comprises:
   a housing;
   an impeller; and
   an electrical motor having an axis of rotation;
      wherein said motor includes an annular stator and a permanently magnetized, circular rotor secured to the impeller and concentrically mounted within said stator;
      said rotor having a first circular end of a given diameter, proximate to said impeller and an axially opposite second circular end having a smaller diameter than said given diameter;
      a single-ball bearing loosely supporting said rotor and impeller;
      a support shaft, having a tip mounting said bearing, axially extending from said housing into an axial cavity in said second circular end;
   wherein said rotor has a circular peripheral outer face between said first and second end;
   said stator has a soft magnetic annular yoke having an inner surface mirroring said outer face and separated from it by a narrow gap, and an annular winding positioned within said gap;
      whereby magnetic forces generated by said rotor urge said rotor axially against said bearing in the absence of an electrical supply to said motor.

2. The pump of claim 1, wherein said outer face and inner surface are axially non-linear.

3. The pump of claim 2, wherein said outer face and inner surface are axially arcuate.

4. The pump of claim 3, wherein said outer face and inner surface define spherical sectors.

5. The pump of claim 1, wherein said winding is secured to said inner surface.

6. The pump of claim 5, wherein said winding extends over said entire inner surface.

7. The pump of claim 1, wherein said yoke comprises insulation-coated particles of ferro-magnetic material coated with an electrically non-conductive substance.

8. The pump of claim 4, wherein said winding comprises:
   at least one insulated conductor wound into a helicoidal multi-turn loop of a given width, said loop being folded at two diametrically opposite locations about a pair of parallel axes to form two substantially symmetrical arches;
   whereby said winding defines a substantially frustro-spherical structure;
   said device being shaped and dimensioned to intimately contact the inner surface of the yoke.

9. The pump of claim 8, wherein said winding comprises a plurality of segments running in alternate opposite directions.

10. The pump of claim 8, wherein the inner surface comprises a pattern of grooves shaped and dimensioned to nest said winding.

11. The pump of claim 1, wherein said segments run obliquely to the axis of rotation.

12. The pump of claim 1, wherein said winding comprises at least one insulated conductor wrapped over a circular frame shaped and dimensioned to run concentrically to and between said inner surface and outer face.

13. The pump of claim 12, wherein said circular frame is made of insulating material.

14. The pump of claim 1, wherein said rotor comprises a permanent magnet having high electrical conductivity.

15. The pump of claim 14, which further comprises a watertight septum shaped and dimensioned to lie between said rotor and said stator whereby said stator is insulated from any fluid moved by said pump.

16. The pump of claim 15, wherein said septum is made of electrically non-conductive material.

* * * * *